Sept. 7, 1943.　　　　M. R. MEYER　　　　2,328,571
TAPE AND CEMENT APPLYING MACHINE
Filed Nov. 14, 1941　　　3 Sheets-Sheet 3
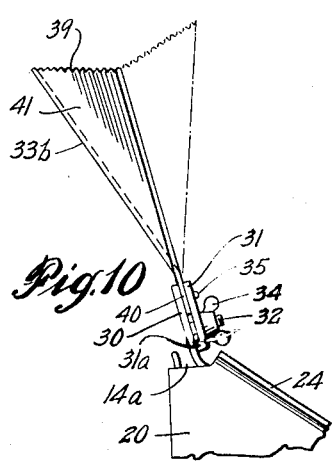
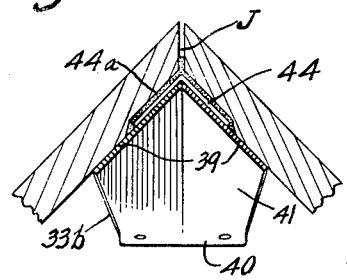
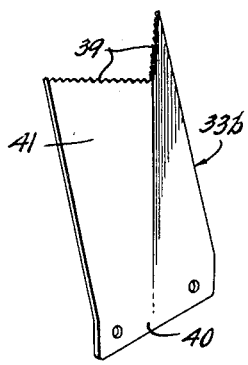
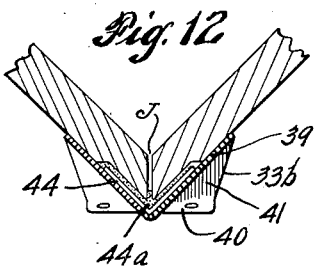
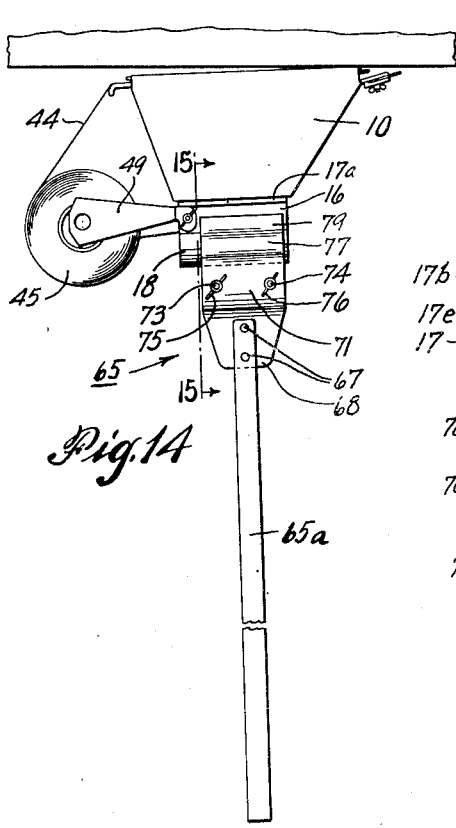
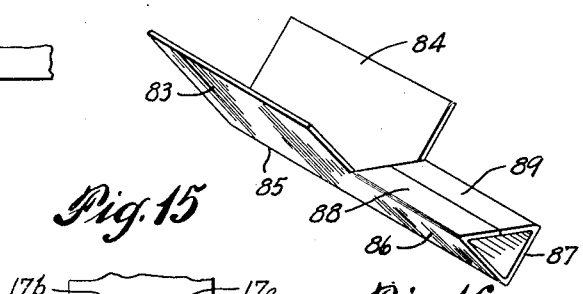
INVENTOR:
MERLE R. MEYER
BY
H. G. Manning
ATTORNEY Patented Sept. 7, 1943

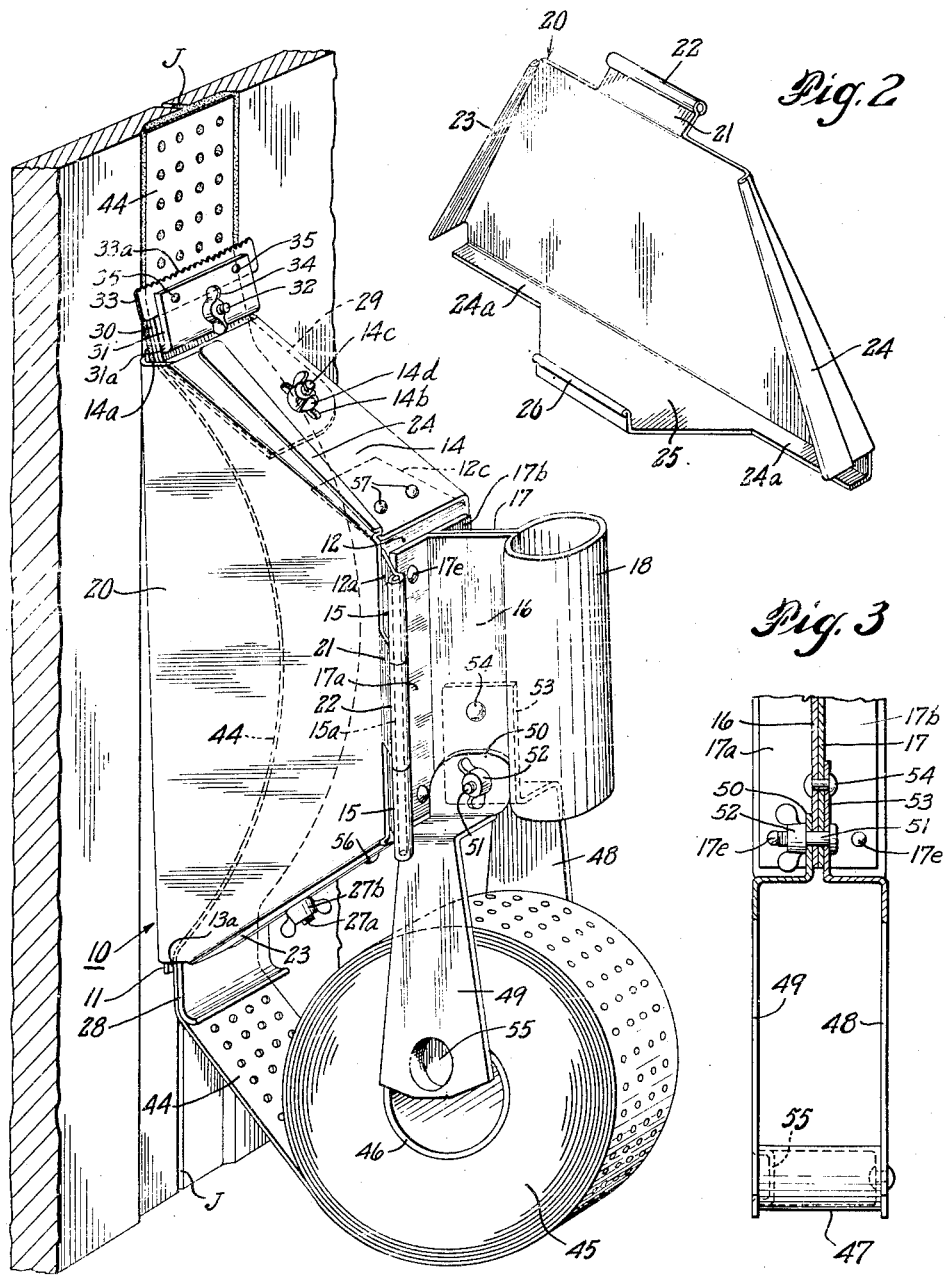

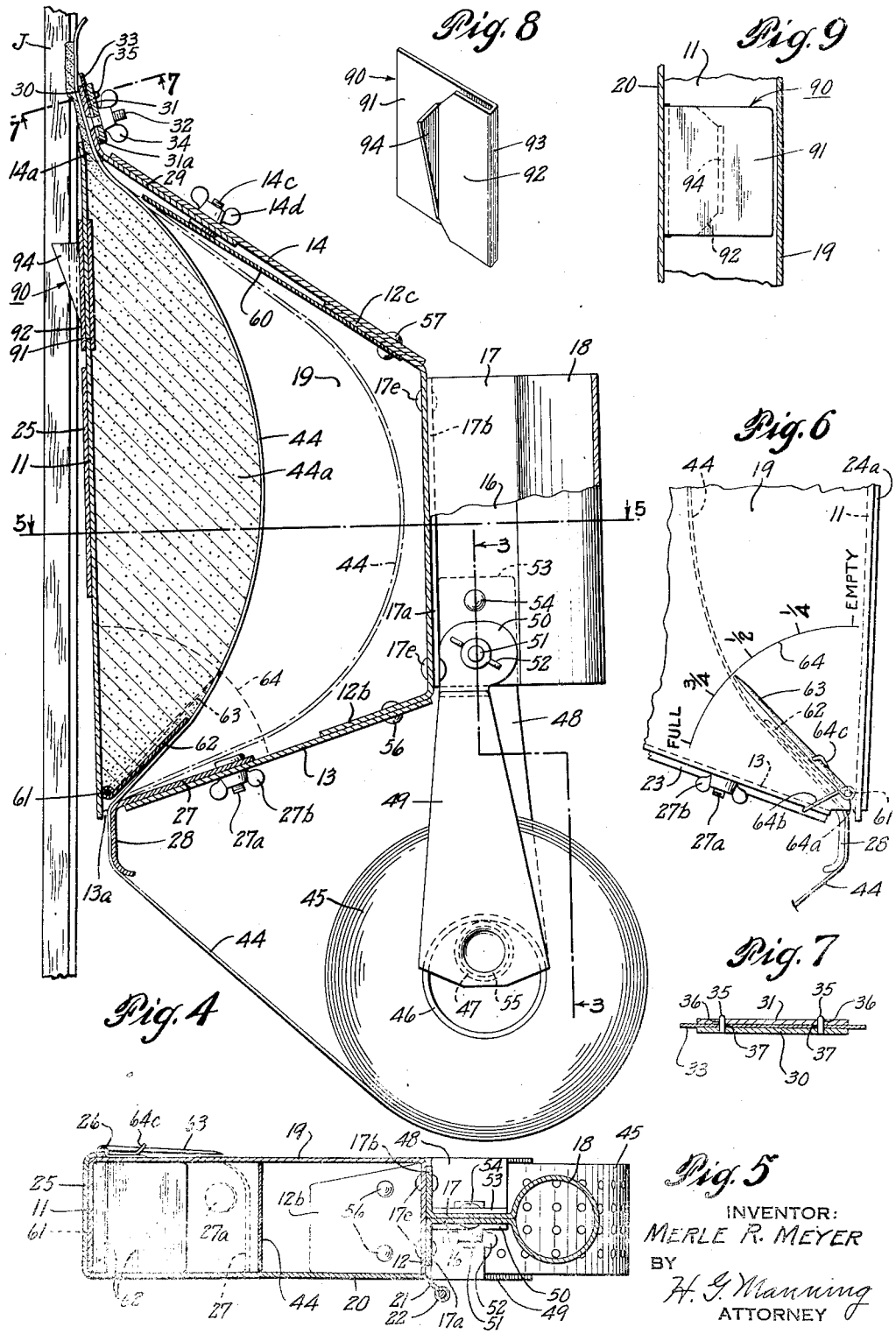

2,328,571

UNITED STATES PATENT OFFICE 2,328,571

TAPE AND CEMENT APPLYING MACHINE

Merle R. Meyer, Waterbury, Conn., assignor to National Gypsum Company

Application November 14, 1941, Serial No. 419,141

13 Claims. (Cl. 216—33)

This invention relates to building constructions, and more particularly to an apparatus for applying a layer of plastic material and a flexible covering strip simultaneously upon a wall or other surface.

One object of this invention is to provide an apparatus of the above nature in which means are provided for extruding the plastic layer in any desired thickness from a container as the covering strip is pulled therefrom.

Another object is to provide an apparatus of the above nature in which the flexible strip will pass partially around the plastic material in the container as it is pulled therethrough in such a manner that the underside of said strip will be coated with said material and caused to adhere firmly to the flat surface upon which it is applied.

A further object is to provide an apparatus of the above nature which is especially adapted for applying cement and reinforcing tape simultaneously upon the joint between two wallboards.

A still further object of the invention is to provide an apparatus of the above nature which will be simple in construction, inexpensive to manufacture, easy to manipulate, compact, ornamental in appearance, and very efficient and durable in use.

With these and other objects in view, there have been illustrated on the accompanying drawings several forms in which the invention may be conveniently embodied in practice.

Figure 1 represents a perspective view of the apparatus in operating position for applying cement and tape to a wallboard joint.

Figure 2 is a perspective view of the hinged cover plate as viewed from the inside.

Figure 3 is a section along the line 3—3 of Figure 4 showing the tape roll supporting bracket—the tape roll being omitted.

Figure 4 is a longitudinal section, partly in elevation, taken substantially along the central plane of the apparatus and through the joint in the wallboard which it is desired to seal.

Figure 5 is a plan sectional view taken along the line 5—5 of Figure 4 with the cement omitted for the sake of clarity.

Figure 6 is a fragmentary side elevational view of the lower portion of the device showing the gauge which indicates the amount of cement remaining in the container at any particular moment.

Figure 7 is a section taken along the line 7—7 of Figure 4.

Figure 8 is a perspective view of an attachment which may be used for maintaining the apparatus in alinement with the wallboard.

Figure 9 is a top view of the same from the inside of the container, as it appears when applied to the base of said container.

Figure 10 is a fragmentary view of the forward portion of the apparatus, showing in full lines a detachable corner tool attached thereto for operation on an "outside" wall corner, and in dot and dash lines the position of said tool when used upon an "inside" corner.

Figure 11 is a fragmentary plan sectional view of an inside corner joint in which tape and cement is being applied by the corner tool shown in Figures 10 and 13.

Figure 12 is a sectional view similar to Figure 11 of an outside corner joint.

Figure 13 is a perspective detail view of the corner tool shown by itself.

Figure 14 is a side elevation of the apparatus as it appears when in use upon a ceiling joint and showing a vertical holder tool clamped about the handle of the apparatus.

Figure 15 is a fragmentary sectional view taken along the line 15—15 of Figure 14.

Figure 16 is a perspective view of a special tool for use in smoothing the cement after it has been applied to a corner joint.

In previous practice employed for filling and reinforcing joints between adjacent wallboards of a building construction, it was customary to first manually fill the open channel with cement and then to apply a flexible strip of suitable material over the outside of the cement by a separate step or operation. According to the present invention the cement and flexible strip are applied simultaneously to the joint, resulting in a material saving of time and producing a smoother surface, a result due to the absence of lumps of cement or dry spots under the tape which might produce air bubbles.

Referring now to the drawings in which like reference numerals denote corresponding parts throughout the several views, the numeral 10 indicates a receptacle or container of substantially trapezoidal shape, the bottom wall 11 of which is about twice the length of the top wall 12, the latter having an inclined hinge section 12a bent outwardly therefrom, and also having a pair of downwardly inclined diverging flaps 12b and 12c which are adapted to fit within the inclined rear and front walls 13 and 14, respectively, of said container as clearly shown in Figure 4. The inclination of the wall 13 is preferably at an angle of about 70° from the bottom wall 11, while the wall 14 is preferably inclined at an angle of about 50° therefrom, as shown.

The bottom portions of the inclined side walls 13 and 14 terminate a short distance above the bottom wall 11 so as to provide a rear entrance slot 13a and a front exit slot 14a, respectively, (see Figure 4). The inclined wall 14 is also provided adjacent its lower end with an elongated slot 14b (see Figure 1) for adjustably receiving a bolt 14c secured in place by a wing nut 14d, said bolt serving to clamp upon the upper end of a front tape guide 29, to be hereinafter more fully described.

The inclined hinge section 12a is provided with a pair of hinge ears 15, 15 which are adapted to embrace the ends of an elongated hinge pin 15a.

As clearly shown in Figure 5, there is mounted upon the top wall 12 a hollow handle consisting of a cylindrical portion 18, connected with a pair of abutting web portions 16, 17, and oppositely extending foot members 17a, 17b which form the means of attachment to the top wall 12 as by rivets 17e.

The container 10 is also provided with a flat side wall 19, and the open front of said container is provided with a cover member 20 having an inclined web 21 at the upper end thereof, said web 21 being provided with a central hinge ear 22 for embracing the hinge pin 15a and cooperating with the ears 15, 15 on the hinge section 12a to pivotally mount the cover upon the container 10.

In order to embrace the rear wall 13, the front wall 14 and the bottom wall 11, the cover member 20 is provided with upstanding edge flanges 23, 24, and 24a, the latter having a tapered extension 25 which terminates in a rolled end catch member 26 which is adapted to resiliently press against the bottom wall 11 and snap behind the side wall 19 so as to securely latch the cover in closed position.

The tape 44, which is preferably made of perforated paper, is guided into the rear of the receptacle through the entrance slot 13a by means of a rear adjustable tape guide 27, which is secured to the wall 13 by a bolt 27a and a wing nut 27b. The rear tape guide 27 is provided with an exterior angular extension 28 which serves to engage and smooth the tape as it passes into the container. The tape 44 is of such width that it fits snugly between the side wall 19 and the cover 20.

Provision is also made at the extrusion end of the container of a front tape guide 29 having a flat downwardly inclined extension 30 which serves to guide the tape and cement out of the forward end of the container.

A removable clamping plate 31 is connected to the flat extension 30 of the front tape guide 29 by means of a bolt 32 located in the center of said guide. The clamp plate 31 is provided with a downturned rear end 31a which engages said extension 30 and serves as a fulcrum for said clamp plate 31.

The bolt 32 serves to press the clamp plate downwardly upon a cutter blade 33 having teeth 33a, whereby the tape remaining in the container may be conveniently severed from the tape already applied to the joint between the adjacent wallboard sections. The bolt 32 is preferably soldered rigidly to the extension 30 of the front tape guide, and is held in position by a wing nut 34 (see Figures 1–4).

*Corner tool attachment*

When it is desired to employ the apparatus for sealing a corner joint between two wallboard sections, the clamp nut 34 will be unscrewed, permitting the cutter member 33 to be removed and a detachable reversible corner tool 33b to be substituted in place thereof (see Figures 10, 11, 12, and 13).

For the purpose of preventing the cutter blade 33 (or corner tool 33b) from shifting out of operating position, the flat extension 30 of the front tape guide 29 is provided with a pair of upstanding pins 35, 35 which are adapted to fit in a corresponding pair of holes 36 in the clamp plate 31, in a pair of holes 37 in the cutter blade 33, and in a pair of holes 38 in the corner tool 33b.

To permit the tearing off of the perforated tape when the corner tool 33b is being used, provision is made of a toothed cutting edge 39 on the forward end of the corner tool against which the tape may be pulled to perform the tearing action.

The corner tool 33b is provided with a rear flat portion 40 and a forward right-angular portion 41 (as clearly shown in Figures 10 to 13) in which the position of the corner tool for operating upon the inside corner wall is shown in Figure 11 and the position of said tool when operating on an outside corner is shown in Figure 12.

Figure 4 clearly illustrates the location of the tape 44 as it appears when passing through the container 10, around the rear tape guide 27 and the mass of plastic cement 44a which extends upwardly from the base in the container. The tape passes out of the container around the front tape guide 29, as shown in Figure 4.

The tape is fed into the container 10 from a roll 45 which is provided with a hollow cardboard core 46, adapted to fit loosely upon a hollow metal core 47, which is attached upon the end of a rigid tapered side holder plate 48. In spaced relation to the rigid holder plate 48, there is provided a complementary swinging side holder plate 49 having an inwardly extending offset reduced base 50 which is adapted to swing about a horizontal bolt 51 passing through one end of the webs 16 and 17 of the handle 18, and said plate 49 is held in locked position by a wing nut 52 (as shown in Figures 1 and 2).

The rigid holder plate 48 is also provided with an inwardly offset rear extension 53, held in place by the bolt 51 and an additional rivet 54 passing through the webs 16 and 17.

The swinging side plate 49 of the roll spindle is provided with a short hollow integral plug 55 adapted to fit snugly within the metal core 47 of the rigid holder plate 48 for retaining the roll of tape 45 in assembled position.

In order to hold the flaps 12b and 12c of the top wall 12 tightly against the surrounding inclined side walls 13 and 14, provision is made of a pair of rivets 56, 56 joining the flap 12b to the wall 13, and a pair of rivets 57, 57 joining the flap 12c to the wall 14.

Provision is also made of a flexible metal guide plate 60 (see Figure 4) secured to one end of the inclined side wall 14 by means of the rivets 57, 57, which guide plate 60 serves to direct the forward end of the tape before it reaches the front tape guide 29 and prevent entanglement with the head of the bolt 14c.

*"Telltale" indicator*

In order to indicate the amount of cement remaining in the container without the necessity of opening the container, provision is made of a "telltale" indicator comprising a bottom horizontal pivot rod 61 passing through the side wall 19 of the container and having a rectangular flap 62 secured rigidly thereto, which flap 62 fits loosely within the interior of the container adjacent the side wall 19 and the cover member 20 thereof.

The "telltale" indicator is also provided with an exterior pointer 63 integral with the pivot rod 61 extending upwardly parallel to the side wall 19. The pointer 63 is adapted to move over a curved scale 64 having suitable indicia marked thereon, such as "Empty," "¼," "½," "¾," and "Full," as indicated in Figure 6. A spring 64a is provided to urge the flap 62 and pointer 63 towards the "Full" indicia on the scale 64 and may be mounted upon the pivot rod 61 between the pointer 63 and the side wall 19, one leg 64b being hooked about the end wall 13 and the other leg 64c hooked about the pointer 63. The spring 64a should be relatively weak but yet have sufficient strength to prevent the flap 62 from sinking into the cement when the apparatus is laid with its base 11 upon a horizontal surface.

*Ceiling implement*

When it is desired to use the present invention for applying cement and tape to the joint between two wallboards located upon a ceiling of a room, where a full length scaffolding is not available, the ceiling holder 65 shown in Figures 14 and 15 may be employed.

The holder 65 comprises an elongated handle rod 65a, preferably of wood, which is provided adjacent its upper end with a slot 66 through which are passed a pair of rivets 67, 67 for clamping the sides of the split section of said handle rod upon a pair of depending plates 68 and 69 of a container clamping member 70.

The clamp plates 68 and 69 are provided with a pair of flat outwardly offset sections 71 and 72 which are adjustably held together by means of a pair of bolts 73 and 74 having wing nuts 75 and 76 secured thereon. Above the flat offset sections 71 and 72, the clamp plates have a pair of outwardly convex sections 77 and 78 shaped to fit the horizontal cylindrical handle 18 of the cement container 10, and said curved sections 77 and 78 are provided with a pair of inwardly offset flat clips 79 and 80 extending upwardly therefrom and having outwardly curved extremities 81 and 82 which serve to facilitate the attachment of the ceiling implement to the container 10. This ceiling implement permits the operator to step down from the short scaffolding and move to a new position without removing the container from engagement with the tape already applied to the ceiling joint.

*Additional corner tool*

Figure 16 discloses an additional corner tool which may be employed for smoothing out the sealed joints formed at the outside and inside corners of the wall of a room after the cement and tape have been applied to said joints by the apparatus described in Figures 1 to 15.

This corner tool includes a pair of flat side members 83 and 84 forming an angle of 90° and joined together by a corner edge 85 extending the full length of said corner tool. The side members 83 and 84 are reduced in width at their rear portions for about ⅓ the length of the corner tool, forming small rear inclined sections 86 and 87, said reduced rear sections being bent inwardly at their upper portions to inclose a rear triangular handle section of said tool by cover portions 88 and 89. In use, the closed handle section will be held in the hand of the operator and the open forward portion including the side members 83 and 84 will be moved manually along the inside or outside corner joint as desired.

*Center guiding attachment*

In the form of the invention shown in Figures 8 and 9, a center guiding attachment 90 is shown which is made by bending from a strip of sheet metal, and consists of a rectangular inner flat plate 91 adapted to lie against the inside surface of the bottom wall 11 of the container. The attachment 90 also has a shorter outside section 92 joined to the section 91 at its edge 93—said outside section having a small outturned V-shaped fin 94 shorter in length than the width of the sections 91 and 92, and being shaped to fit in the joint J between the abutting sections of a pair of wallboards.

The V-shaped guide fin 94 is of such size and so located that when in place upon the bottom wall 11 of the container 10, it will maintain the center of the front tape guide 29 in accurate alinement with the joint between the abutting wallboard panels, thus facilitating the application of the tape 44 over the joint in proper centralized position.

*Operation*

In the operation of applying tape and cement simultaneously to the joint J between a pair of wallboards, a roll of tape 44 or other flexible strip will first be placed upon the spool spindle 47 and latched in place by swinging the side plate holder 49 so as to bring the short plug 55 into alinement with the hollow core 47 of the rigid portion of the spool spindle. The plug will then be inserted in the core and the parts locked in assembled position by screwing up the wing nut 52 upon the bolt 51. The tape 44 will then be passed around the rear tape guide 27, inserted in the container through the rear slot 13a passed over the flap 62, and pulled out of the container around the flexible guide 60 and the front tape guide 29 through the exit slot 14a. A loop will thus be formed in the tape within the container, (as shown in dotted lines in Figure 4) for receiving a previously strained air-drying cement-and-water mixture which may be of any desired suitable extrudable composition. The container below the tape will then be filled with the plastic cement mixture, and the tape pulled tightly against said cement so that when the tape is manually drawn out of the nozzle around the front tape guide 29, a layer of cement about ⅟₁₆ of an inch in thickness will adhere to the undersurface of the tape and will be extruded through the exit slot 14a with said tape 44. The full line position of the tape 44 indicates its appearance when about one-half of the cement has been extruded from the container.

It will be understood that the operation of pulling the tape out of the container will provide the force necessary to keep the tape in tight engagement with the cement remaining in the container and will extrude the necessary amount of cement upon the under surface of the tape as the container is drawn along the entire length of the joint. The end of the tape already applied to the wall will then be severed from the tape remaining in the container by swinging the container at an angle and twisting it to cause the cutting edge 33 to tear off the tape at the desired point.

The next operation is to press the tape down into the soft cement in the sealed joint by a suitable tool, such as a trowel or broad knife—the excess cement either being removed, or spread back over the surface of the tape and feathered out at its edges to blend with the adjacent portions of the wallboards. The cement and tape will then be allowed to dry about 24 hours, after which it will be ready for applying a subsequent touching-up or finishing outer coat of cement, if necessary. The joint may then be sanded down, smoothed and made flush with the face of the wallboard panels preparatory to painting or papering.

When it is desired to apply the tape and cement to a corner, the corner spreader tool shown in Figures 10 to 13 will be placed in position on the end of the nozzle of the container in place of the cutter blade 33b. As the apparatus is drawn along the edge of the corner, the operator will manually pull out the tape and extrude the cement layer exactly as in the first form of the invention. It will be understood, of course, that the process may be carried out with the present apparatus without using the corner tool attachment, in which case the tape will be manually bent at right angles around an outside or within an inside corner by hand or trowel, and the final smoothing down done by means of the spreader corner tool shown in Figure 16.

It is to be understood in this application wherever parts are described and shown as connected by rivets, that bolts and nuts or spot-welding may be substituted within the spirit and scope of the invention.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an apparatus for sealing a joint between two wallboards, a closed container having a flat extruding nozzle, means for mounting a roll of flexible tape rotatably on said container, means for guiding tape so mounted into said container and out of said nozzle, said container being adapted to receive a mass of pasty cement, the tape in said container forming a loop adapted to embrace such cement, the force of manually pulling said tape out of said nozzle serving to keep said tape in tight contact with the cement remaining in said container, and causing the necessary amount of cement to be extruded upon the undersurface of said tape as the apparatus is drawn along the entire length of said joint.

2. The apparatus specified in claim 1 in which the means for guiding said tape into said container is adjustable.

3. The apparatus specified in claim 1 in which the discharge opening of said nozzle is adjustable.

4. The apparatus specified in claim 1 in which said container is trapezoidal in shape for embracing the loop of tape and cement therein.

5. The apparatus specified in claim 1 in which a movable cover is provided for one side of said container to permit the supply of cement to be replenished.

6. In an apparatus for sealing a joint in a wall with a flexible tape coated with cement, a container for pasty cement having a flat side and a flat extruding nozzle, a spool for holding a roll of said tape secured to the exterior of said container, means to guide said tape from said spool into said container, means to guide said tape out of said nozzle, said container being adapted to receive a mass of extrudable pasty cement to be held against said flat side by a loop of said tape passing around one side of said cement mass, the force exerted in pulling said tape out of said nozzle serving to maintain said cement in tight contact with the undersurface of said tape to coat it and cause the necessary amount of cement for filling said joint and attaching said tape to the wall to be extruded from said nozzle as the apparatus is drawn along said joint.

7. The apparatus specified in claim 6 in which said container is provided with a handle for convenience in manipulation.

8. The apparatus specified in claim 6 in which a cutting blade is provided on the end of said flat nozzle for use in severing the end of the tape already applied to the joint from the remainder of the tape.

9. The apparatus specified in claim 6 in which a front tape guide extends outwardly through said nozzle, a clamping plate is located on the outer surface of the tape guide, and bolt and nut means are provided for pressing said clamping plate upon said guide.

10. In an apparatus for concealing an open joint in a wall, a container for an extrudable mass of cement having a flat extruding nozzle adapted to be drawn along said joint, means for mounting a roll of flexible material on one side of said container, material from a roll so mounted being guided into said container around one side of said mass of cement and out of said nozzle, the force exerted in pulling said material out of said nozzle causing the necessary amount of cement to be extruded in contact with the undersurface of said material for filling said joint and coating the surface of the wall adjacent thereto.

11. The invention set forth in claim 10 in which a pivoted telltale plate is provided in said container, said plate being spring-pressed upwardly against the undersurface of said tape within the container and serving to indicate the amount of cement remaining in said container.

12. The apparatus set forth in claim 1 in which a resilient guide plate is provided at the extruding end of said container to hold the tape out of contact within the adjacent wall thereof.

13. In an apparatus for applying a layer of cement and covering tape simultaneously to an open wall joint, a container for said cement, means for drawing tape through said container, a flat nozzle on said container for extruding cement in contact with said tape by the force exerted in pulling said tape, and a center guiding means secured to said container in alinement with the center of said nozzle to centralize said tape with respect to said joint.

MERLE R. MEYER.